Oct. 24, 1961     C. A. ESCOFFERY     3,005,862

SOLAR BATTERY MOUNTING MEANS

Filed Sept. 15, 1958     2 Sheets-Sheet 1

INVENTOR.
CHARLES A. ESCOFFERY
BY
*Angus & Mou*
ATTORNEY.

Oct. 24, 1961 C. A. ESCOFFERY 3,005,862
SOLAR BATTERY MOUNTING MEANS
Filed Sept. 15, 1958 2 Sheets-Sheet 2

INVENTOR.
CHARLES A. ESCOFFERY
BY
ATTORNEY.

United States Patent Office 3,005,862
Patented Oct. 24, 1961

3,005,862
SOLAR BATTERY MOUNTING MEANS
Charles A. Escoffery, Los Angeles, Calif., assignor to International Rectifier Corporation, El Segundo, Calif., a corporation of California
Filed Sept. 15, 1958, Ser. No. 761,051
7 Claims. (Cl. 136—89)

This invention relates to solar batteries and more particularly to mounting arrangements of a battery of solar cells.

The principal object of the invention is to provide a relatively lightweight but strong solar-battery mounting arrangement; and a related object is to provide a sturdy mounting arrangement which can readily be shaped or curved to desired configurations. A further object is to provide a large surface area of exposure of the cells of a battery to sunlight.

Photovoltaic or solar cells are well known as means for generating voltage in response to energy from the sun. A photovoltaic cell commonly comprises a flat sheet or wafer of semi-conductor material, such as a wafer cut from silicon crystal or the like, having a metallic conductive layer or coating on its base, constituting a terminal of the cell, and having its other terminal on the opposite surface of the wafer. When sunlight strikes the last-mentioned surface, the light penetrates into a region of the crystal where there is a P-N junction, and the action of the light at this region generates the voltage in a well-known manner. Ordinarily each cell of this character develops only a fraction of a volt; but a battery can be made up from a plurality of such cells to provide a desired voltage and current delivering capacity, by suitable connection of a number of the cells in series or parallel arrangements.

Solar batteries are useful as a D.C. voltage supply for charging storage batteries, or for other purposes, and are particularly useful in satellites and missiles. Satellites have heretofore been equipped with solar batteries which have been placed within the envelope of the satellite; and to admit the sun to the solar cells, the satellites have been provided with windows through which the light enters to strike the cells mounted behind the windows. For use in missiles and satellites, as well as for other purposes, it is desired to have the weight of the cell mounting as low as possible.

In accordance with the present invention, the several solar cells of a solar battery are mounted on a paneling means in the form of a sheet having a configuration which provides a plurality of protruding nodes. The cells are mounted on these nodes and are placed side by side so that they can be arranged substantially to cover the area of the mounting panel which is supporting the cells, while allowing such spacing between the cells as may be desired for electrically separating one cell from another.

In accordance with a preferred feature, the protruding nodes of the paneling are of such dimensions and are so spaced from each other that each node can accommodate an individual solar cell which is suitably attached to the node.

Where the paneling is of an electrically conducting material, such as aluminum or other lightweight metal, which is a preferred material for the purpose, it is contemplated to mount the individual cells to their nodes by suitable insulating means to prevent shortcircuiting from one cell to another.

According to another preferred feature, the individual cells have an area more than sufficient to cover the nodes.

A mounting arrangement according to this invention is especially useful because of its relatively great strength in comparison with its weight, while permitting substantially complete coverage of the paneling area by the photocells. Moreover, the paneling by its nature can be formed to desired configurations, for example, a sphere or part of a sphere or cylinder or cone so that the paneling itself can form a wall of a satellite; and the presence of the battery of solar cells attached to the outer surface of this paneling exposes them to sunlight without the requirement for other more cumbersome and heavy mounting arrangements such as have been used in the past for a satellite wherein the cells were mounted inside the satellites and behind windows therein.

The foregoing and other features of the invention will be better understood from the following detailed description and the accompanying drawings of which:

FIG. 1 is a plan view of a solar cell;
FIG. 2 is a cross-section view taken at line 2—2 of FIG. 1;
FIG. 3 is a plan view of part of a panel having solar cells mounted thereon in accordance with this invention, the cells being omitted over part of the panel to reveal the construction of the panel;
FIG. 4 is a cross-section view taken at line 4—4 of FIG. 3;
FIG. 5 shows a manner of interconnecting the solar cells shown in FIGS. 1 and 2;
FIG. 6. shows in cross-section part of a paneling having cells mounted thereon, shaped to a curved form in accordance with this invention; and
FIG. 7 shows a solar cell and mounting panel arrangement according to this invention in which the nodes on one side of the panel are of different dimensions than on the other side of the panel.

Referring to the drawing, FIG. 1 shows a plan view and FIG. 2 a cross-section view of a typical solar cell 4 of a known type. It comprises a flat wafer 5 of semi-conductor, ordinarily cut from a crystal such as silicon. The base surface is coated with a suitable electrically conducting coating 6 such as nickel plate as by the well-known chemical plating process known as electrodeless plating and the upper or active surface is treated with a suitable doping substance, which may be, for example, boron when the silicon crystal is N-type. The boron may be applied in a well-known manner as for example by passing boron trichloride over the N-type silicon while the silicon is hot. This treatment will cause boron to diffuse into the silicon with the result that a P-N junction will form just beneath the silicon surface which is thus doped with the boron. The boron-doped silicon at the surface will be P-type and the silicon beneath the junction will be N-type. The boron-doped layer 7 will be very thin, for example in the order of about .0001 inch or less thick and will readily allow the sunlight to penetrate into it and become absorbed in the P-layer. This action of the light generates electrons and positive holes separated by the electric field of the junction, which results in the generation of a D.C. voltage between the layers 6 and 7 in a well-known manner.

As an alternative arrangement, the crystal wafer 5 may be P-type silicon, and the outer surface layer 7 should then be made of the N-type, as by diffusing phosphorus into it.

For the purpose of making contact with the two sides of the solar cell, suitable metallic ohmic contacting means 8 and 9 are provided. Each of these contacting means 8 and 9 may comprise a strip of a conducting metal. The strip 8, for example, may be a length of nickel or copper or the like which may be plated over the layer 7 so as to form a base for soldering an electrical connection. Similarly a strip 9 may be formed as by plating nickel or copper over the base layer 6, so that the strip 9 may serve as a base for soldering a connection.

It will be understood that the thicknesses of the layers in the cross-section view of FIG. 2 are exaggerated for the purpose of illustration; and actually the solar cell will usually be thinner in relation to its area than appears in this figure.

Further details of the making of such a solar cell need not be given here as the cell itself does not constitute the present invention. Furthermore it will be understood that other solar cells than the particular type just described may be used instead.

A panel structure which can be used to support the cells in accordance with the present invention is shown in FIGS. 3 and 4. These figures show the paneling with the solar cells mounted on them but part of FIG. 3 shows the cells broken away to give a face view of the paneling itself. It should be understood that the panel alone does not constitute the invention; and this particular paneling is part of a structure shown in Scurlock Patent 2,481,046. It comprises a core sheet 10 which is formed from a single flat sheet by embossing or indenting the sheet. Sheet member 10 has a plurality of square indentations in the form of hollow truncated square pyramids arranged in two groups. All of the indentations of one group are similarly oriented with respect to directions in a plane parallel to the medial plane of the sheet as defined below, while all of the indentations of the other group are oppositely oriented. One group of these indentations comprises the upwardly extending indentations 50 that terminate in square outer walls or surfaces 11 which define truncated portions of the full pyramids. The other group of indentations comprises the oppositely or downwardly extending indentations 51 that terminate in square outer walls or surfaces 12, which also define truncated portions of the full pyramidal indentations.

It is contemplated sheet member 10 will ordinarily be made from a flat sheet by a stamping operation in which the two groups of indentations 50 and 51 are formed by striking them up and down respectively from the flat sheet. For these reasons, but without any limitation to this particular method of forming the panel to be inferred therefrom, the panel may be considered as having two groups of pyramidal indentations of which one group is at one side of a surface or position located at the initial position of the original flat sheet, and the other group of indentations lies at the other side of said surface. This surface or position then becomes medial surface or position 13 of the embossed sheet member. Walls or nodes 11 are uniformly spaced from position 13 at one side thereof, and walls 12 are uniformly spaced from position 13 at the other side thereof; and preferably surfaces 11 and 12 are equally spaced from the medial surface or position. It will be understood, however, that surfaces 11 and 12 need not necessarily be equally spaced from the medial position; and for this reason the term "medial" as used herein is to be considered in a broad sense to include planes or surfaces either at or near the mid-point between the outer surfaces 11 and 12.

The neutral plane of the panel shown in FIGS. 3 and 4 coincides with the medial plane; and both are planes in the arrangement of FIGS. 3 and 4, as the panel is there shown flat. However, the panel may not always be flat but may sometimes be curved as a sphere or cylinder in which case the neutral or medial surface or position is no longer a plane but rather a curved surface or area. Hence the expression "medial surface" or "medial position" is used herein as being broader, and in some instances, more accurate than "medial plane."

The square indentations of each group are of the same size and shape, that is, they are congruent and they are symmetrically interspaced between indentations of the other group. In the preferred form shown, in which the medial surface 13 coincides with the neutral surface of the panel, the indentations 50 are the same size and shape as the indentations 51. Each indentation has four inclined side walls 15; and square surfaces 11 are connected with square surfaces 12 by these sloping side wall portions which extend divergently away from the four sides of outer faces 11 and 12. Since each indentation of one group has its side walls coplanar with the side wall portions of each adjacent indentation of the other group, these two coplanar side wall portions are substantially flat in continuous planes which extend from one side of the sheet to the other between square surfaces 11 and 12. The continuous character of these flat coplanar side walls 15 is shown clearly in the sectional view, FIG. 4. If the panel be curved to a shape such as a cylinder or sphere, there may be some slight curvature of various ones of the walls but the degree of curvature of any particular wall will be slight.

The coplanar side walls of adjacent pyramids intersect at a common point 16 substantially at the medial position 13. Because of the thickness of the metal sheet, intersection takes place in a zone rather than at a geometrical point; and the medial surface for this reason may well be considered as a zone rather than a plane in the strict geometrical sense. This zone has a thickness approximately equal to the thickness of the sheet; and it is within this zone that the side walls intersect.

The formation of the panel at and around this point of intersection is shown to advantage in FIG. 3 in which it will be seen that the intersection of the four sides 15 defines a total of four angle portions two of which are salient and two re-entrant. Two salient angles 18 alternate with two re-entrant angles 19, so that the four angle portions are alternately arranged about the common point of intersection 16. Both salient angles 18 are located above medial plane 13, while the re-entrant angles 19 are located below the medial plane. It will be noted that each salient angle 18 formed by a linear intersection of two surfaces 15 is aligned across the point of intersection 16 with a re-entrant angle 19 formed by a linear intersection of two other surfaces 15 so that a straight line drawn along and through two opposed angle portions passes through the common point of intersection of all the coplanar side walls intersecting at a common point 16. Since each salient angle portion is directly in line through the point of intersection with a re-entrant angle portion, the salient and re-entrant angle portions provide for direct transmission of tension and compression stresses along an interrupted straight line between opposite sides of the panel, that is, between surfaces 11 and 12.

While precise dimensions are not critical, it is found that certain dimensions or ranges of dimensions or proportions are preferred. The acute angles A which sides 15 of the pyramidal indentations make with the medial plane are uniform and should be not less than twenty degrees and preferably are greater than thirty degrees, the angle chosen being dependent somewhat upon the type of material used. In FIGS. 3 and 4, the acute angle A is in the vicinity of forty-five degrees.

The material of which the paneling is made should be of light weight, yet strong and durable, and readily flexed to form desired configurations, such as a curved or cylindrical or spherical wall of a satellite. A preferred material is aluminum, although it will be understood that other materials such as stainless steel, berryllium, magnesium, or titanium, or even plastic may be used.

The solar cells 4 of FIGS. 1 and 2 are shown with square upper and lower surfaces, as the square shape is considered best for fitting the particular panel of FIGS. 3 and 4. The cells are attached to the paneling by attaching one cell per node of the paneling as shown in FIGS. 3 and 4. For this purpose the base surface 6 of the cell (FIG. 4) is placed adjacent to the panel node and suitably attached to the node. The means of attachment may be a suitable cement or resin or the like 20, for example an epoxyresin; and the term "cementitious material" covers broadly all of this general class of attaching materials. For clarity of illustration the lower and upper layers 6 and 7 are not shown in FIG. 4, it being understood that these are relatively thin as compared with the thickness of the crystal. For the purpose of preventing short-circuiting from one cell to another as the cells are connected together, the attaching cement or resin should be of an insulating material, when the panel is electrically conducting. A preferred arrangement of the cells on the panel nodes are as shown in FIG. 3 wherein the diagonals of the square cells pass through and bisect the sides of the square nodes. In this manner, the sides of the square cells are aligned with each other, and the supporting node for each cell is located at a central position of the cell, with the base of each cell overlapping its node, as shown. In order to prevent short-circuiting, it is desired that at least a small space be allowed between adjacent cells; and this space will serve also to permit the passage of connecting leads 21, from one cell to another.

The cells may be electrically arranged in any desired manner. Ordinarily it will be desired to connect a number of cells in series, so as to build up the generated voltage considerably beyond that of each individual cell. To do this, the base of one cell is connected to the active surface 7 of another cell by a lead 21, as shown in FIG. 4, the leads 21 being soldered to the respective strips 8 and 9 as required, as by solder 40.

In FIG. 5 there are shown several series arrangements which are not shown connected with each other; and it will be understood that they may be interconnected in any suitable manner if desired.

Figure 1:
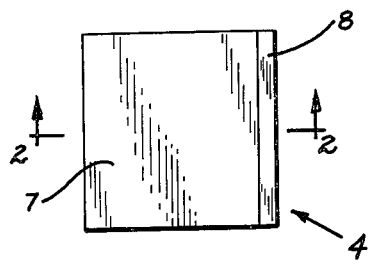
Figure 2:
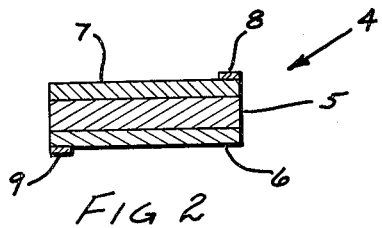
Figure 6:
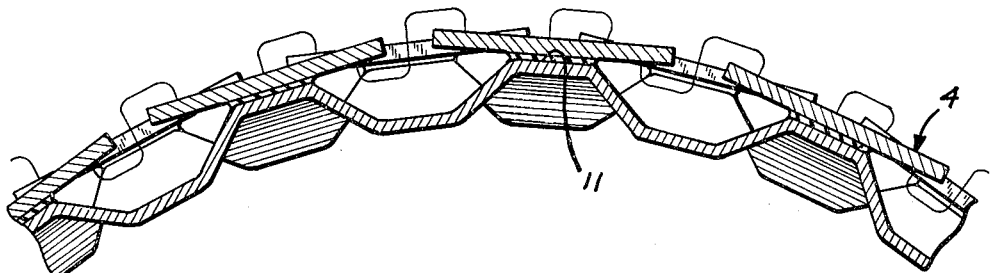
FIG. 6 shows in cross-section part of a curved paneling having cells mounted on one side thereof. The cross-section of FIG. 6 may for example be the panel arrangement of FIG. 4 curved to a cylindrical form; or alternatively it may represent a cross-section of the paneling curved to a spherical form.

The invention is not limited to the particular arrangement shown in the drawings. Other forms of paneling than the square-shaped nodes may be used and other than square-shaped solar cells may be used. The polygons forming the indentations may have more or less than four sides. For example, paneling with triangular-shaped nodes may be used, such as is also shown in the said Scurlock Patent 2,481,046, and such paneling may conveniently use other than square-shaped solar cells. Again, the nodes may be of a rectangular shape as is also shown in the Scurlock patent.

Figure 7:
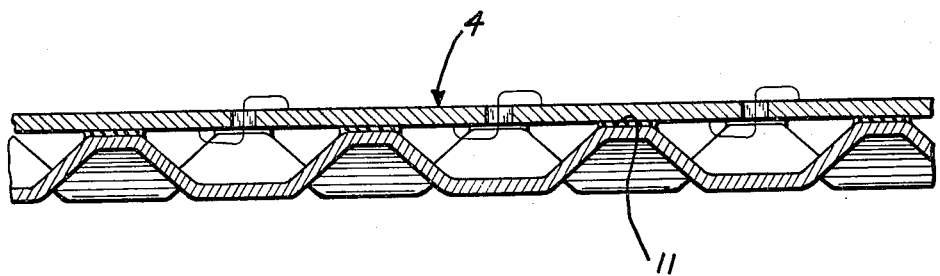
Figure 3:
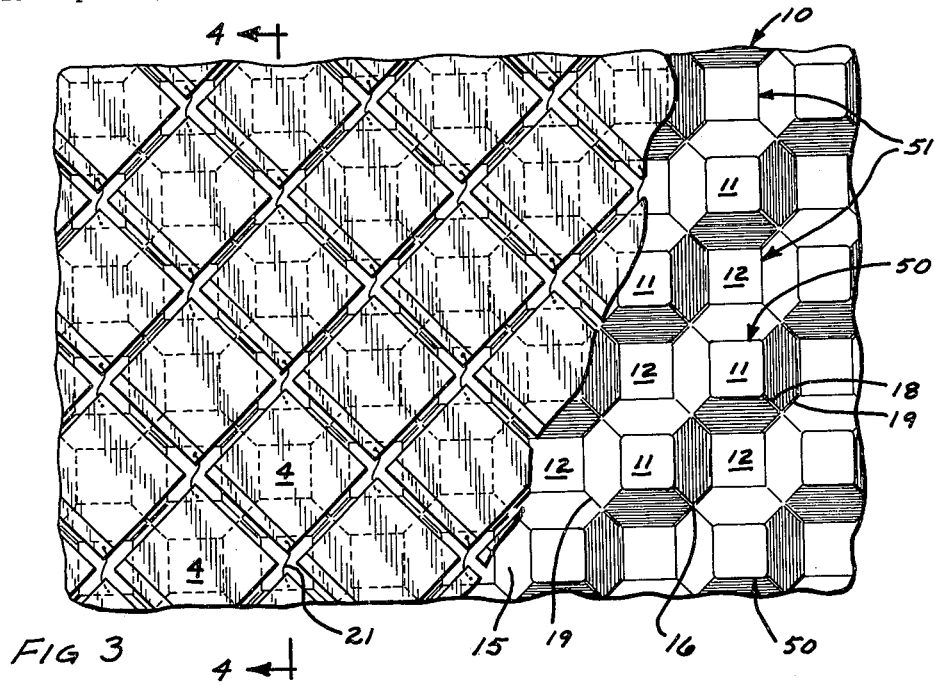
Figure 4:
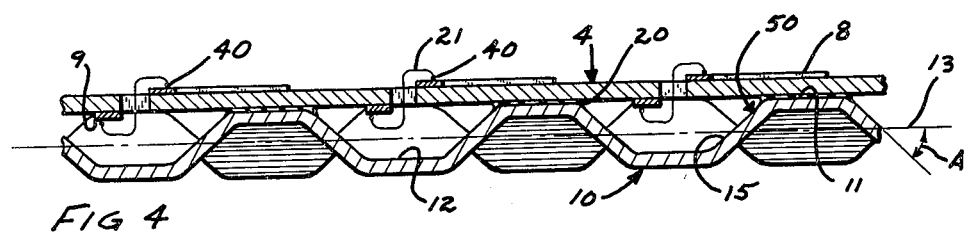
Figure 5:
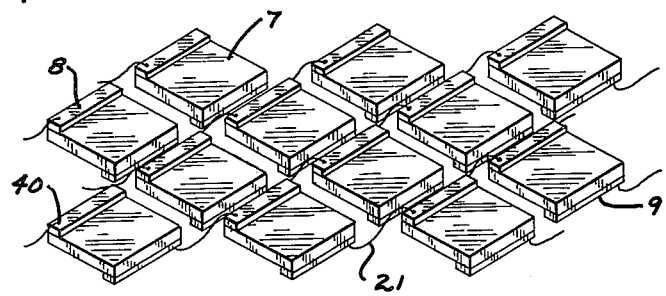
FIG. 5 shows in perspective a convenient manner of arranging these connections for some of the cells, it being shown that the leads 21 are connected substantially at adjacent diagonal corners of the cells.

While the paneling of FIGS. 3 and 4 has been shown with square nodes 11 and 12 equal in size, this equality of the nodes is not always essential. For example, squares 11 may, if desired, be made smaller than squares 12, or vice versa; and alternately while nodes 11 may be squares, the opposite surface of the panel need not necessarily be in the form of squares. FIG. 7 shows an arrangement in which the squares 11 are made proportionately smaller than the opposite surface of the panel. In a case such as that of FIG. 7, the said opposite surface will then appear as the principal surface of the panel. And such a panel may be made by making the indentations for squares 11 from original sheet stock. In that case, the medial plane or surface referred to hereinabove would not represent the original surface of the sheet. When the nodes on the two sides of the panel are unequal in size, the solar cells may be mounted on either group of nodes. Alternatively, the nodes on one or both sides of the panel may be of varying size, although that will not ordinarily be desirable.

These observations made in reference to different sizes or arrangements of nodes 11 and 12 correspondingly apply to indentations or embossments providing nodes of different shape than squares, as for example triangular or rectangular nodes.

It will be recognized that by the present invention there is provided a lightweight structure of which the paneling may conveniently form the wall of a vehicle such as a satellite, and which incurs relatively little additional weight in attaching solar cells. In addition to the weight of the solar cells themselves with their interconnecting leads the only other weight incurred in attaching the cells is the weight of the cementing or attaching material. Since only a small amount of this is used per cell, this is not a great additional weight. Furthermore, when the area of the nodes is less than the area of the corresponding cell, the amount of cementing or attaching material is thereby minimized. The structure is readily flexed to desired shapes and is capable of presenting a substantially complete covering of solar cells even though the area of the nodes is substantially less than the complete area.

The invention is not limited except in accordance with the scope of the appended claims.

What is claimed is:

1. In combination, a panel and a plurality of solar cells, said panel comprising a core sheet member of rigid sheet material provided with a plurality of hollow polyhedral indentations extending in opposite directions from a medial position of said sheet member, said indentations comprising one group of similarly oriented congruent indentations having polygonal outer wall portions located in uniformly spaced relation to and at one side of such medial position, and a second group of similarly oriented congruent indentations having polygonal outer wall portions located in uniformly spaced relation to and at the other side of said medial position, each indentation having a plurality of inclined substantially planar side wall portions extending divergently from the respective sides of its outer wall portion to said medial position, and means attaching said cells individually to individual nodes of one of said groups, the area of each cell being greater than the area of its respective node.

2. A combination according to claim 1 in which cement attaches the bases of said cells to the surfaces of their respective nodes.

3. Apparatus according to claim 1, in which the nodes of said one of said groups are square.

4. Apparatus according to claim 1, in which the nodes of said one of said groups are square and said cells are square.

5. Apparatus according to claim 1 in which the nodes of said one of said groups are square and said cells are square and the diagonals of the square cells substantially bisect the sides of the respective nodes.

6. Apparatus according to claim 1 in which the plurality of cells substantially cover the surface of the panel to which they are attached.

7. Apparatus according to claim 1 in which a plurality of the cells are connected to other of the cells, at least some of the connections comprising a lead from the active surface of one cell to the base of another cell.

References Cited in the file of this patent
UNITED STATES PATENTS

| 2,305,576 | Lamb | Dec. 15, 1942 |
| 2,481,046 | Scurlock | Sept. 6, 1949 |

FOREIGN PATENTS

| 331,022 | Switzerland | Aug. 15, 1958 |